(12) United States Patent
Nagasawa et al.

(10) Patent No.: US 12,394,249 B2
(45) Date of Patent: Aug. 19, 2025

(54) ACTION-MODEL GENERATION APPARATUS AND ACTION-MODEL GENERATION METHOD

(71) Applicant: Mitsubishi Electric Corporation, Tokyo (JP)

(72) Inventors: Fuminori Nagasawa, Tokyo (JP); Akito Arai, Tokyo (JP); Ryoji Hattori, Tokyo (JP); Seiji Okumura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 450 days.

(21) Appl. No.: 17/880,250

(22) Filed: Aug. 3, 2022

(65) Prior Publication Data

US 2022/0375267 A1 Nov. 24, 2022

Related U.S. Application Data

(63) Continuation of application No. PCT/JP2020/013149, filed on Mar. 24, 2020.

(51) Int. Cl.
*G06K 9/00* (2022.01)
*G06V 10/80* (2022.01)
*G06V 40/20* (2022.01)

(52) U.S. Cl.
CPC .............. *G06V 40/23* (2022.01); *G06V 10/80* (2022.01)

(58) Field of Classification Search
CPC ........... G06V 40/23; G06V 10/80; G06T 7/02
See application file for complete search history.

(56) References Cited

U.S. PATENT DOCUMENTS

| 2007/0222565 A1 | 9/2007 | Kawamata et al. |
| 2010/0238168 A1 | 9/2010 | Kim et al. |
| 2014/0301605 A1 | 10/2014 | Kawaguchi |
| 2017/0316255 A1 | 11/2017 | Arata |

(Continued)

FOREIGN PATENT DOCUMENTS

| CN | 103827891 A | * | 5/2014 | ............ A63F 13/213 |
| CN | 108520237 A | * | 9/2018 | ......... G06K 9/00342 |

(Continued)

OTHER PUBLICATIONS

Hiramatsu et al., "System for the Description and Display of Human Body Movement," Transactions of Information Processing Society of Japan, vol. 40, No. 3, Mar. 15, 1999, pp. 939-948 (total 12 pages).

(Continued)

*Primary Examiner* — Xin Jia
(74) *Attorney, Agent, or Firm* — BIRCH, STEWART, KOLASCH & BIRCH, LLP

(57) ABSTRACT

A basic-action-model acquisition unit (103) acquires a basic-action model which has been generated by analyzing a state of each of a plurality of parts of a movable object when the movable object performs a basic action, and which is a model for recognizing the basic action, for each of a plurality of the basic actions. An advanced-action-model generation unit (104) combines two or more basic-action models among a plurality of basic-action models, and generates an advanced-action model which is a model for recognizing an advanced action which is an action more complex than the basic action.

3 Claims, 17 Drawing Sheets

(56) References Cited

U.S. PATENT DOCUMENTS

| | | |
|---|---|---|
| 2019/0080262 A1 | 3/2019 | Yazaki et al. |
| 2019/0251338 A1 | 8/2019 | Yamauchi et al. |
| 2019/0347779 A1 | 11/2019 | Onda et al. |
| 2021/0201006 A1 | 7/2021 | Kimura |
| 2021/0279452 A1 | 9/2021 | Kimura |

FOREIGN PATENT DOCUMENTS

| | | | |
|---|---|---|---|
| CN | 110287848 A | * | 9/2019 |
| JP | 10-222668 A | | 8/1998 |
| JP | 2007-264732 A | | 10/2007 |
| JP | 2010-218556 A | | 9/2010 |
| JP | 2010-267004 A | | 11/2010 |
| JP | 2011-186576 A | | 9/2011 |
| JP | 2013-125402 A | | 6/2013 |
| JP | 2017-199303 A | | 11/2017 |
| JP | 2017-228100 A | | 12/2017 |
| JP | 2019-53368 A | | 4/2019 |
| JP | 2019-101919 A | | 6/2019 |
| JP | 2019-139570 A | | 8/2019 |
| JP | 2019-144830 A | | 8/2019 |
| JP | 2019-191981 A | | 10/2019 |
| JP | 2019-200241 A | | 11/2019 |
| JP | 2019-204464 A | | 11/2019 |

OTHER PUBLICATIONS

Inamura et al., "Construction of the Proto-Symbol Space that Realizes Recognition and Generation of Various Motion Patterns based on Geometric Symbol Manipulation," Journal of the Robotics Society of Japan, vol. 27, No. 5, Jun. 15, 2009, pp. 84-94 (total 13 pages).

International Search Report (PCT/ISA/210) issued in PCT/JP2020/013149, dated Aug. 25, 2020.

To et al., "Human Action recognition Using Temporal Processing for Sequential Skeleton Data," The 81st National Convention of IPSJ, Information Processing Society of Japan, 2019, total 3 pages.

* cited by examiner

Fig. 5

|     | (a) | (b) | ... | (f) |
|-----|-----|-----|-----|-----|
| 401 | x011, y011, z011 | x012, y012, z012 | ... | x016, y016, z016 |
| 402 | x021, y021, z021 | x021, y022, z022 | ... | x026, y026, z026 |
| ... | ... | ... | ... | ... |
| 424 | x241, y241, z241 | x242, y242, z242 | ... | x246, y246, z246 |

Fig. 7

| | |
|---|---|
| 601 | x611, y611, z611 |
| 602 | x621, y621, z621 |
| ⋮ | ⋮ |
| 615 | x751, y751, z751 |

Fig. 11

|  | (a) | (b) | ... | (f) |
|---|---|---|---|---|
| 601 | x611, y611, z611 | x611, y611, z011 | ... | x611, y611, z611 |
| 602 | x621, y621, z621 | x621, y621, z621 | ... | x621, y621, z621 |
| ... | ... | ... | ... | ... |
| 616 | x761, y761, z761 | x761, y761, z761 | ... | x761, y761, z761 |
| 413 | x131, y131, z131 | x132, y132, z132 | ... | x136, y136, z136 |
| ... | ... | ... | ... | ... |
| 423 | x231, y231, z231 | x232, y232, z232 | ... | x236, y236, z236 |
| 424 | x241, y241, z241 | x242, y242, z242 | ... | x246, y246, z246 |

ACTION-MODEL GENERATION APPARATUS AND ACTION-MODEL GENERATION METHOD

CROSS REFERENCE TO RELATED APPLICATIONS

This application is a Continuation of PCT International Application No. PCT/JP2020/013149, filed on Mar. 24, 2020, which is hereby expressly incorporated by reference into the present application.

TECHNICAL FIELD

The present disclosure relates to generation of an action model for recognizing an action of a movable object.

BACKGROUND ART

Patent Literature 1 discloses an action recognition program which causes a computer to function to recognize an action in video data showing a person. More specifically, Patent Literature 1 discloses a skeleton-information extracting means, a joint recognizing engine, an area cutting-out means, a moving-body recognizing engine, and a score integrating means.

The skeleton-information extracting means extracts pieces of skeleton information based on joints of a person from the video data in a time-series manner. The joint recognizing engine recognizes actions based on the pieces of skeleton information of the video data. The area cutting-out means extracts surrounded areas of the pieces of skeleton information from the video data. The moving-body recognizing engine recognizes actions based on the surrounded areas in the video data. The score integrating means outputs for each action, an integrated score obtained by integrating scores of the joint-recognizing engine and the moving-body recognizing engine.

CITATION LIST

Patent Literature

Patent Literature 1: JP2019-144830A

SUMMARY OF INVENTION

Technical Problem

A technique of Patent Literature 1 uses a model with which relatively simple actions such as "drink", "eat", "run", and "fold", for example, can be recognized, and recognizes these actions. Since there are many samples of video data of the simple actions described above, it is not difficult to generate proper models for these actions. However, since there are a few samples of video data of a complex action, there is a problem that it is difficult to generate a proper model.

One of main objects of the present disclosure is to solve the above-described problem. More specifically, the present disclosure mainly aims to enable generating a proper model also for a complex action.

Solution to Problem

An action-model generation apparatus according to the present disclosure includes:

a basic-action-model acquisition unit to acquire a basic-action model which has been generated by analyzing a state of each of a plurality of parts of a movable object when the movable object performs a basic action, and which is a model for recognizing the basic action, for each of a plurality of the basic actions; and an advanced-action-model generation unit to combine two or more basic-action models among a plurality of basic-action models, and generate an advanced-action model which is a model for recognizing an advanced action which is an action more complex than the basic action.

Advantageous Effects of Invention

According to the present disclosure, it is possible to generate a proper model also for a complex action.

BRIEF DESCRIPTION OF DRAWINGS

FIG. 5 is a diagram illustrating an example of the basic-action model according to the first embodiment.

FIG. 7 is a diagram illustrating an example of the basic-action model according to the first embodiment.

FIG. 11 is a diagram illustrating an example of the advanced-action model according to the first embodiment.

DESCRIPTION OF EMBODIMENTS

Figure 1:
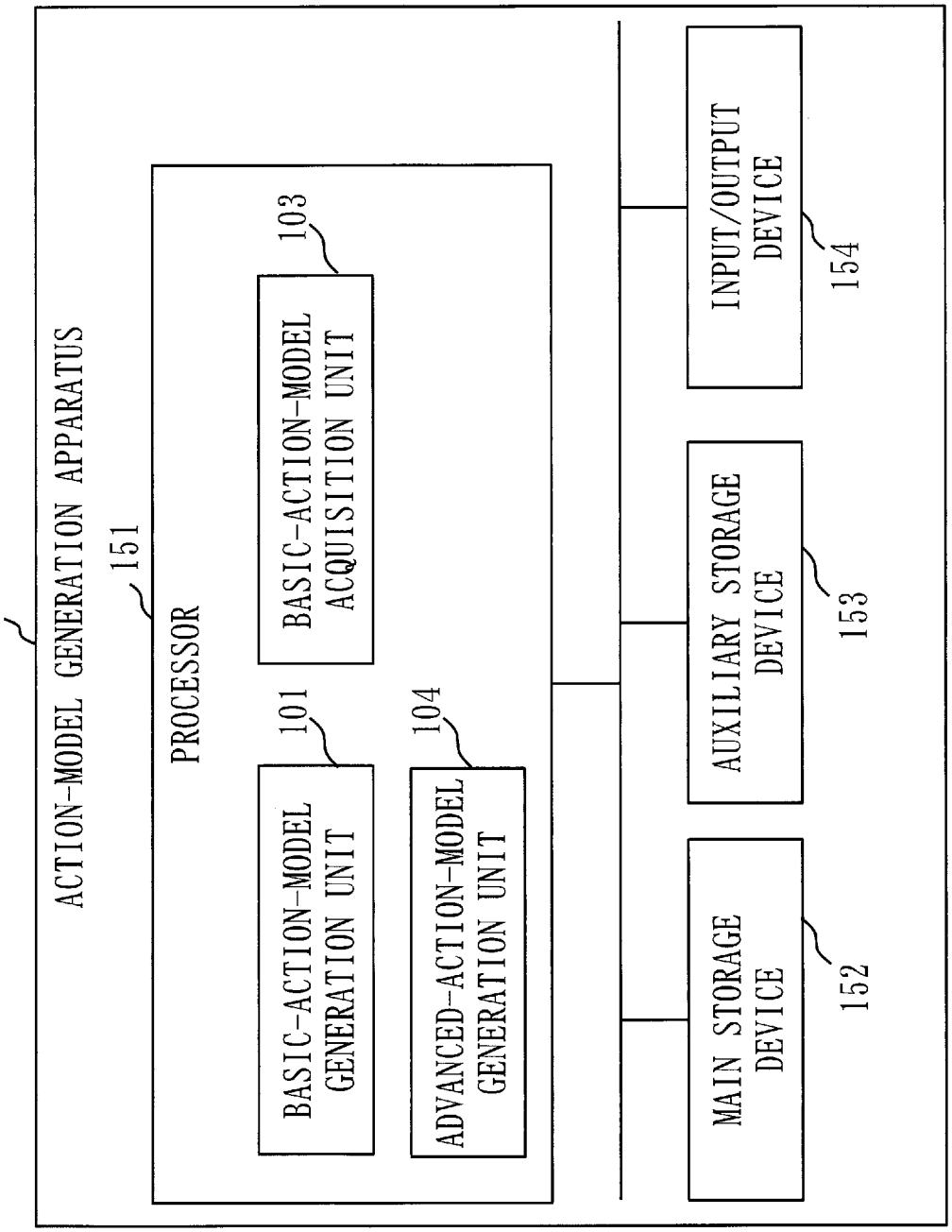
FIG. 1 is a diagram illustrating a hardware configuration example of an action-model generation apparatus according to a first embodiment.

Hereinafter, embodiments will be described with reference to the drawings. In the following description of the embodiments and the drawings, elements assigned the same reference numerals indicate the same elements or corresponding elements.

First Embodiment

*Outline*

In the present embodiment, an action-model generation apparatus 100 which generates action models will be described.

The action-model generation apparatus 100 according to the present embodiment combines two or more models (hereinafter, referred to as "basic-action models") for recognizing basic actions of a movable object, and generates a model (hereinafter, referred to as an "advanced-action model") for recognizing an advanced action.

The movable object is an object which has a plurality of parts each of which moves. The movable object is typically a person. Also, the movable object includes an animal, a robot, a machine tool, and the like in addition to the person. Below, descriptions will be given mainly using the person as an example of the movable object.

In a case of the person, the part of the movable object is a part having a joint. For example, the part of the movable object is a position to which a reflective marker is attached in an optical motion capture technique. Further, in the present embodiment, an element which has been touched by the movable object is also treated as the part of the movable object. For example, when the movable object is the person, a smart phone, a canned beverage, a keyboard, a mouse, a pen, or the like which has been touched by the person is also treated as the part of the person.

Further, the basic action is a simple and basic action. In the case of the person, the basic action is "walk", "run", "sit down", "eat", "write", "look at a smart phone", "type on a keyboard", or the like, for example. For example, a user of the action-model generation apparatus 100 can arbitrarily decide what kind of action is the basic action.

The advanced action is a more complex action than the basic action. An example of the advanced action is an action of looking at a smart phone while walking (hereinafter, referred to as "a smart phone while walking"). "a smart phone while walking" includes two actions of "walk" and "look at a smart phone" and is a complex action. Below, descriptions will be given, mainly using "a smart phone while walking" as an example of the advanced action.

Even if the basic-action model is applied to video data of the advanced action, the advanced action cannot be recognized correctly. Specifically, when the basic-action model for the basic action "walk" is applied to video data of "a smart phone while walking", "a smart phone while walking" can possibly be recognized as a "walk" action, but "a smart phone while walking" cannot correctly be recognized as "a smart phone while walking".

Further, since the advanced action is the complex action, the number of samples of the video data tends to be small. Thus, even if learning is conducted with use of the video data, it is difficult to generate a model with which the advanced action can be correctly recognized, since the number of samples of the video data is small.

For this reason, the action-model generation apparatus 100 according to the present embodiment generates the advanced-action model for the advanced action "a smart phone while walking", by combining the basic-action model for the basic action "walk" and the basic-action model for the basic action "look at a smart phone"

*Description of Configuration*

FIG. 1 illustrates a hardware configuration example of the action-model generation apparatus 100 according to the present embodiment.

The action-model generation apparatus 100 according to the present embodiment is a computer. An operation procedure of the action-model generation apparatus 100 is equivalent to an action-model generation method. Also, a program which realizes operations of the action-model generation apparatus 100 is equivalent to an action-model generation program.

The action-model generation apparatus 100 includes a processor 151, a main storage device 152, an auxiliary storage device 153, and an input/output device 154 as pieces of hardware.

The auxiliary storage device 153 stores programs which realize functions of a basic-action-model generation unit 101, a basic-action-model acquisition unit 103, and an advanced-action-model generation unit 104 which will be described later.

These programs are loaded from the auxiliary storage device 153 into the main storage device 152. Then, the processor 151 executes these programs and performs operations of the basic-action-model generation unit 101, the basic-action-model acquisition unit 103, and the advanced-action-model generation unit 104 which will be described later.

FIG. 1 schematically illustrates a situation where the processor 151 executes the programs which realize the functions of the basic-action-model generation unit 101, the basic-action-model acquisition unit 103, and the advanced-action-model generation unit 104.

The input/output devices 154 are a mouse, a keyboard, and a display, for example.

Figure 2:
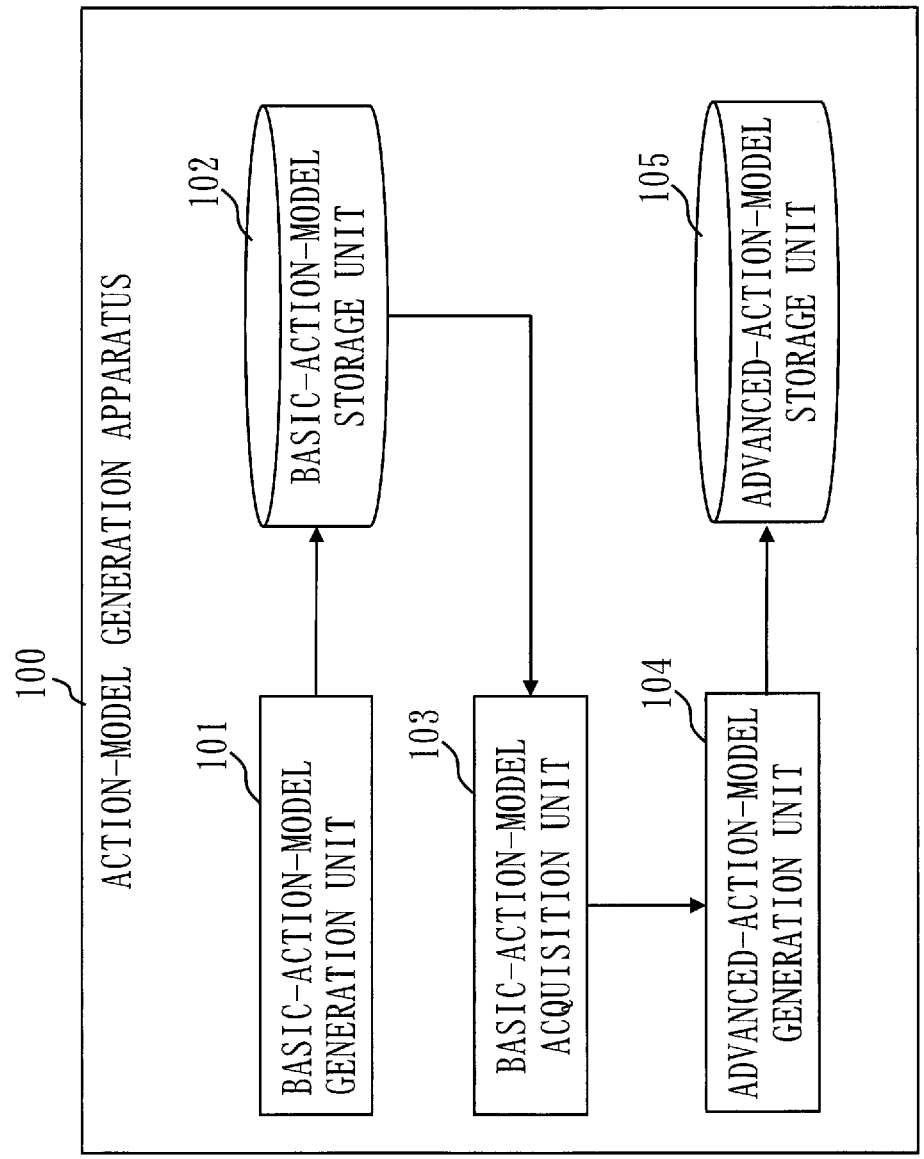
FIG. 2 is a diagram illustrating a functional configuration example of the action-model generation apparatus according to the first embodiment.

FIG. 2 illustrates a functional configuration example of the action-model generation apparatus 100 according to the present embodiment.

The action-model generation apparatus 100 is constituted by the basic-action-model generation unit 101, a basic-action-model storage unit 102, the basic-action-model acquisition unit 103, the advanced-action-model generation unit 104, and an advanced-action-model storage unit 105.

The basic-action-model generation unit 101 generates basic-action models. More specifically, the basic-action-model generation unit 101 learns, for example, pieces of video data and analyzes states of each of a plurality of parts when the movable object performs the basic action. Then, the basic-action-model generation unit 101 generates the basic-action models, using the states of the plurality of parts obtained by the analysis.

The basic-action-model storage unit 102 stores a plurality of basic-action models generated by the basic-action-model generation unit 101.

The basic-action-model storage unit 102 is realized by the main storage device 152 or the auxiliary storage device 153, for example, The basic-action-model acquisition unit 103 acquires the plurality of basic-action models corresponding to a plurality of basic actions from the basic-action-model storage unit 102 based on a request from a user of the action-model generation apparatus 100.

Note that, a process performed by the basic-action-model acquisition unit 103 is equivalent to a basic-action-model acquisition process.

The advanced-action-model generation unit 104 combines two or more basic-action models among the plurality of basic-action models, and generates the advanced-action model. More specifically, the advanced-action-model generation unit 104 analyzes the states of each of the plurality of parts when the movable object performs the advanced action. Then, the advanced-action-model generation unit 104 generates as a provisional model, a model for recognizing the advanced action, using the states of the plurality of parts obtained by the analysis. Further, the advanced-action-model generation unit 104 generates the advanced-action model, using two or more basic-action models a result of combination of which resembles the provisional model.

A process performed by the advanced-action-model generation unit 104 is equivalent to an advanced-action-model generation process.

The advanced-action-model storage unit 105 stores the advanced-action model generated by the advanced-action-model generation unit 104.

The advanced-action-model storage unit 105 is realized by the main storage device 152 or the auxiliary storage device 153, for example.

The advanced-action model stored in the advanced-action-model storage unit 105 is to be used for analysis on video data by a video-data analysis apparatus (not illustrated) which analyzes the video data.

*Description of Operation*

Figure 3:
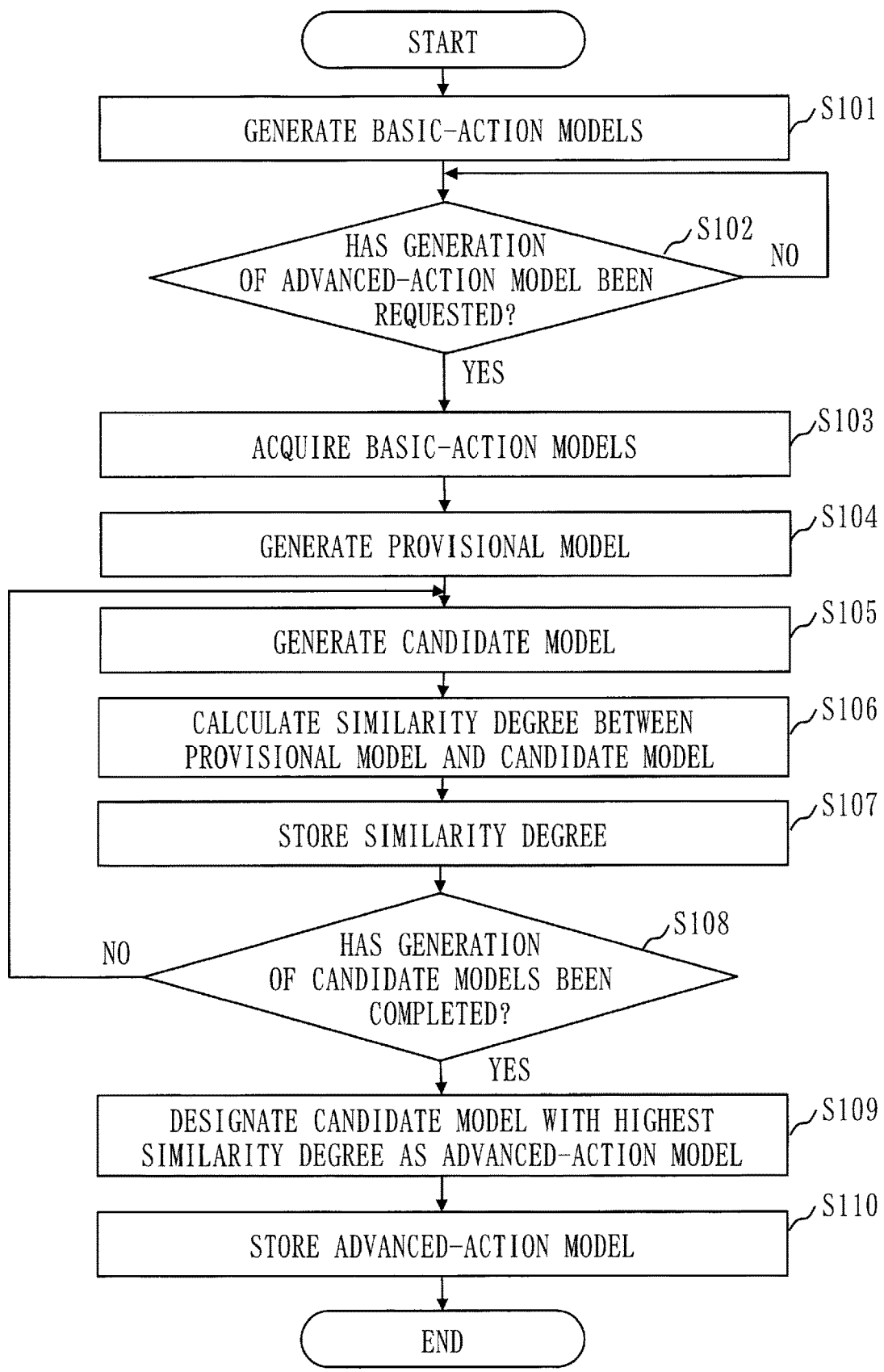
FIG. 3 is a flowchart illustrating an operation example of the action-model generation apparatus according to the first embodiment.

FIG. 3 illustrates an operation example of the action-model generation apparatus 100 according to the present embodiment. Here, mainly an example will be described in which the action-model generation apparatus 100 combines the basic-action model for the basic action "walk" and the basic-action model for the basic action "look at a smart phone", and generates the advanced-action model for the advanced action "a smart phone while walking".

First, in step S101, the basic-action-model generation unit 101 generates the basic-action models.

More specifically, the basic-action-model generation unit 101 performs learning which uses as teacher data, pieces of video data each indicating the basic action. Then, the basic-action-model generation unit 101 analyzes transitions of the states of each part of the movable object and generates the basic-action model indicating the transitions of the states of each part of the movable object. The basic-action-model generation unit 101 generates a plurality of basic-action models corresponding to a plurality of basic actions.

Then, the basic-action-model generation unit 101 stores the generated basic-action models in the basic-action-model storage unit 102.

Figure 4:
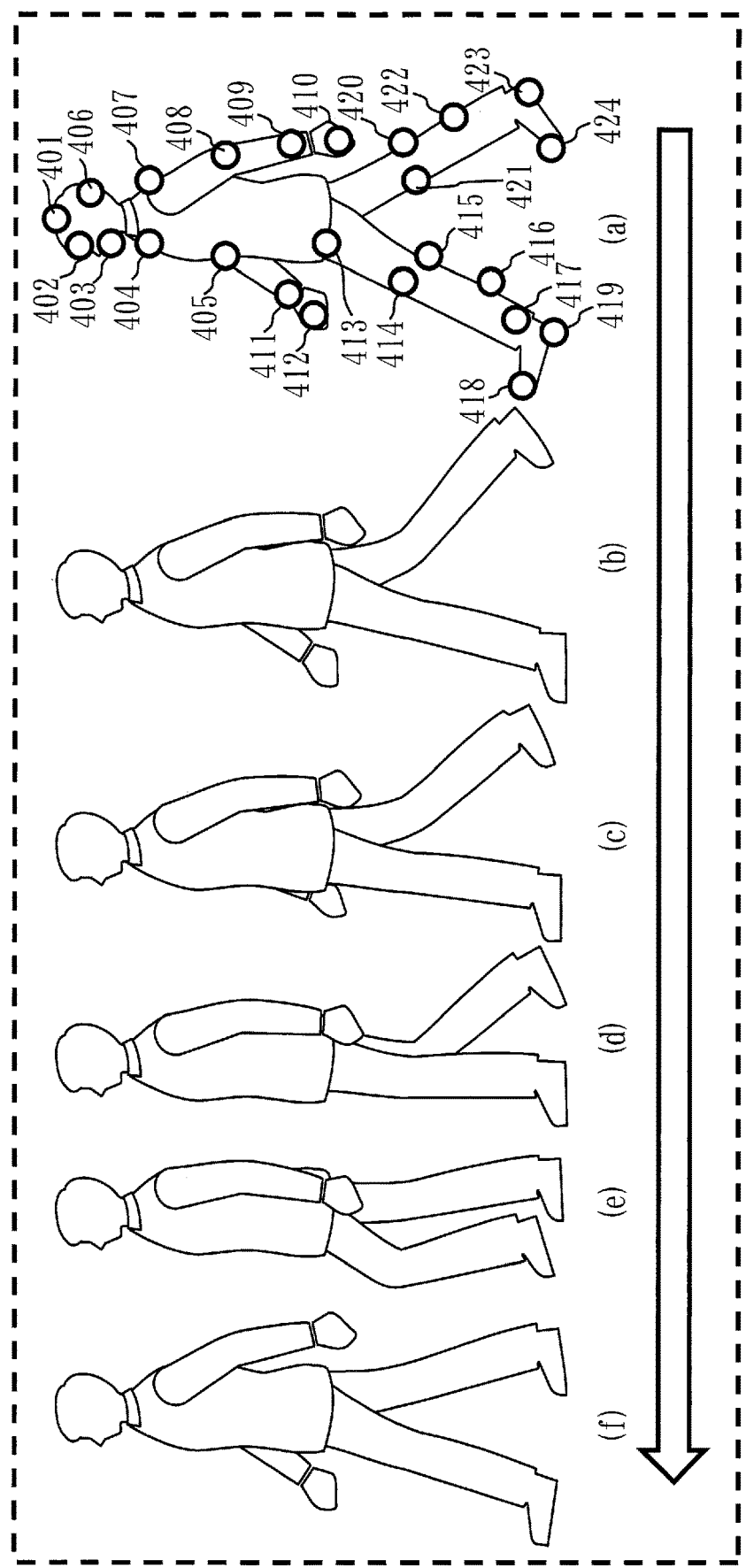
FIG. 4 is a diagram illustrating a generation example of a basic-action model according to the first embodiment.

FIG. 4 illustrates an example in which the basic-action-model generation unit 101 generates the basic-action model for the "walk" action in step S101.

The basic-action-model generation unit 101 learns video data (moving-image data) in which a person walks, for example, in a direction of an arrow in FIG. 4 in order from (a) to (f). At this time, at each of steps (a) to (f), the basic-action-model generation unit 101 learns states (an angle, a position, and the like) of each body part of the person expressed by white circles with numerals 401 to 424 in FIG. 4. In FIG. 4, for drawing convenience, the white circles expressing the body parts are depicted only in (a) of FIG. 4. However, also in (b) to (f) of FIG. 4, the basic-action-model generation unit 101 learns the states of the same body parts as those in (a) of FIG. 4.

In this way, the basic-action-model generation unit 101 can learn transitions of the states of the body parts over time in the basic action "walk".

The basic-action-model generation unit 101 generates the basic-action model in which a movement of each body part and the "walk" action are correctly reflected, by learning a plurality of pieces of video data of the "walk" action.

For example, the basic-action-model generation unit 101 generates the basic-action model for the "walk" action which indicates the transitions of the states of each part over time, as illustrated in FIG. 5. In FIG. 5, coordinate values (x, y, and z) at each of steps (a) to (f) in FIG. 4 are indicated for each of the body parts 401 to 424 in FIG. 4.

Further, the basic-action-model generation unit 101 may remove from the basic-action model, information on a body part whose degree of influence on detection of the basic action is small. For example, for the basic-action model for the "walk" action, the basic-action-model generation unit 101 may remove from the basic-action model, information on a body part which is not directly related to the "walk" action, such as a movement of a head. As the degree of the influence used at this time, the basic-action-model generation unit 101 can use, for example, a score value calculated for each machine learning which has been used at a time of generating the basic-action model. In the present embodiment, it is presumed that the basic-action-model generation unit 101 does not remove the information on the body part whose degree of the influence is small.

Note that, the body parts 401 to 424 subject to the learning are examples, and the basic-action-model generation unit 101 may learn body parts different from these in FIG. 4. Also, the values of each body part in the basic-action model do not have to be the coordinate values (x, y, and z).

Figure 6:
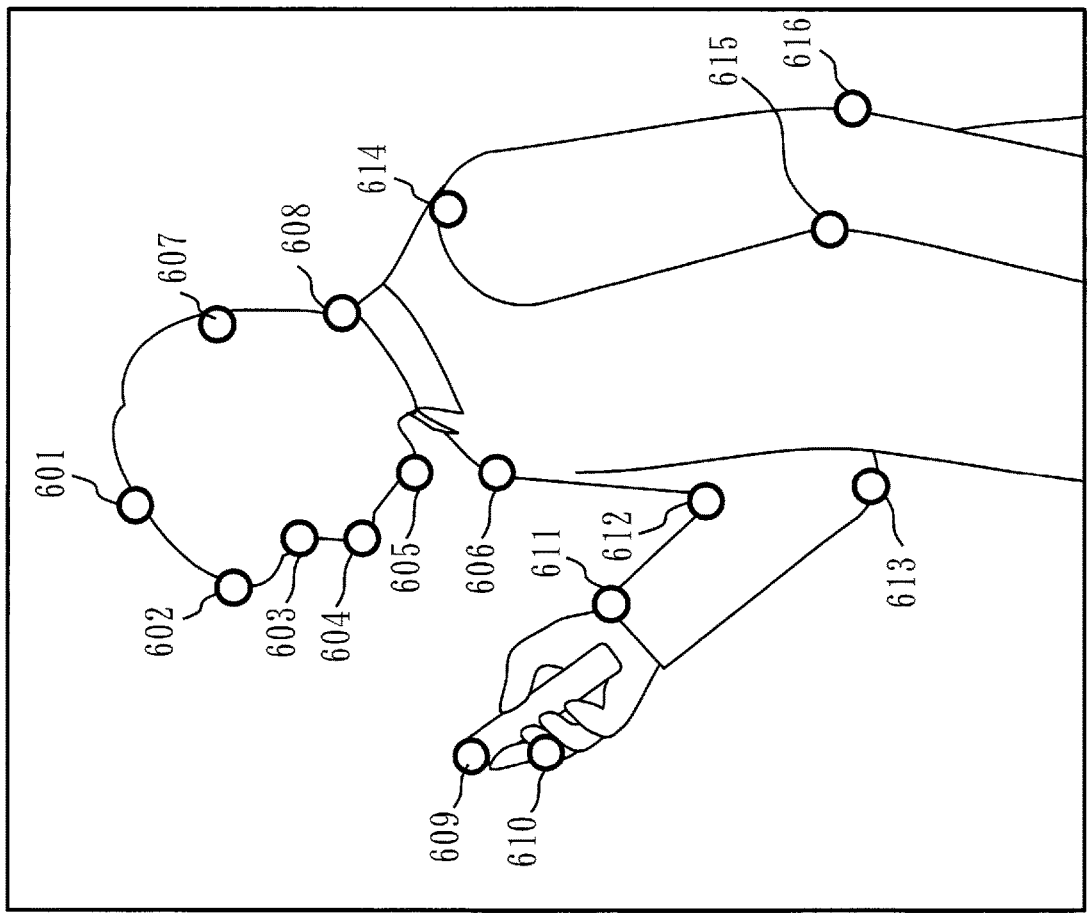
FIG. 6 is a diagram illustrating a generation example of the basic-action model according to the first embodiment.

FIG. 6 illustrates an example in which the basic-action-model generation unit 101 generates the basic-action model for the "look at a smart phone" action in step S101.

The basic-action-model generation unit 101 learns states (an angle, a position, and the like) of each body part of the person expressed by, for example, white circles with numerals 601 to 616 in FIG. 6. In this way, the basic-action-model generation unit 101 can learn the states of the body parts in the basic action "look at a smart phone".

The basic-action-model generation unit 101 generates the basic-action model for the "look at a smart phone" action in which the states of each body part are reflected, by learning a plurality of pieces of video data of the "look at a smart phone" action.

The basic-action-model generation unit 101 generates the basic-action model for the "look at a smart phone" action as illustrated in FIG. 7, for example. In FIG. 7, coordinate values (x, y, and z) of each of the body parts 601 to 616 illustrated in FIG. 6 are indicated.

Note that, for the "look at a smart phone" action, since changes in the states of each body part at each time point are small, the basic-action-model generation unit 101 may learn still-image data instead of the moving-image data.

Note that, the body parts 601 to 616 subject to the learning are examples, and the basic-action-model generation unit 101 may learn body parts different from these in FIG. 6. Also, the values of each body part in the basic-action model do not have to be the coordinate values (x, y, and z).

Returning to FIG. 3, in step S102, the basic-action-model acquisition unit 103 determines whether or not generation of the advanced-action model has been requested by the user of the action-model generation apparatus 100. A generation request specifies the advanced-action model subject to the generation. In the present embodiment, it is presumed that the generation request specifies the generation of the advanced-action model for "a smart phone while walking".

Note that, the user of the action-model generation apparatus 100 requests the generation of the advanced-action model by operating, for example, a mouse or a keyboard.

If the generation of the advanced-action model has been requested by the user of the action-model generation apparatus 100, the process proceeds to step S103.

In step S103, the basic-action-model acquisition unit 103 acquires the plurality of basic-action models from the basic-action-model storage unit 102.

Next, in step S104, the advanced-action-model generation unit 104 generates the provisional model.

Specifically, the advanced-action-model generation unit 104 performs learning which uses video data of "a smart phone w % bile walking" as the teacher data. Then, the advanced-action-model generation unit 104 analyzes transitions of states of each body part and generates the provisional model indicating the transitions of the states of each body part. A generation method of the provisional model is the same as the generation method of the basic-action model in step S101.

The number of samples of the video data of "a smart phone while walking" which is a complex action is small. For this reason, the advanced-action-model generation unit 104 cannot generate an exact model in which the action of "a smart phone while walking" is reflected, but can generate the provisional model in which minimum characteristics of the action of "a smart phone while walking" are reflected.

Next, in step S105, the advanced-action-model generation unit 104 combines the two or more basic-action models among the plurality of basic-action models acquired by the basic-action-model acquisition unit 103, and generates the candidate model. The advanced-action-model generation unit 104 generates the candidate model, basically by combining basic-action models each of which does not have information on the same body part. However, the advanced-action-model generation unit 104 may generate the candidate model by combining the basic-action models each of which has the information on the same body part. In this case, the advanced-action-model generation unit 104 combines the basic-action models by a method of averaging the pieces of information on corresponding body parts.

When directions of the two or more basic-action models to be combined are different from each other, the advanced-action-model generation unit 104 performs adjustment to lessen influence of a difference between the directions. Specifically, the advanced-action-model generation unit 104 performs the adjustment so that particular body parts of the two or more basic-action models to be combined are oriented towards a certain direction. The advanced-action-model generation unit 104 rotates at least one of the two or more basic-action models so that directions of typical body part such as a waist or a neck, for example, become the same.

Note that, the advanced-action-model generation unit 104 may remove from the combination in step S105, a basic-action model for a basic action fundamentally different from the advanced action. In an example of the advanced action "a smart phone while walking", the advanced-action-model generation unit 104 can remove, for example, a basic-action model for a basic action "eat", a basic-action model for a basic action "write", and the like from the combination in step S105.

Next, in step S106, the advanced-action-model generation unit 104 calculates a similarity degree between the provisional model and the candidate model.

The advanced-action-model generation unit 104 calculates the similarity degree between the provisional model and the candidate model by a method using a Hamming distance, for example. Further, the advanced-action-model generation unit 104 may calculate the similarity degree between the provisional model and the candidate model, using a sum of absolute values of differences in the coordinate values (x, y, and z) of each of the corresponding body parts between the provisional model and the candidate model. For example, the advanced-action-model generation unit 104 treats as a distance, the sum of the absolute values of the differences in the coordinate values (x, y, and z) of each of the corresponding body parts between the provisional model and the candidate model. Then, the advanced-action-model generation unit 104 may calculate a reciprocal of the distance as the similarity degree. In this case, when directions of the provisional model and the candidate model are different from each other, the advanced-action-model generation unit 104 performs the adjustment as described above to lessen the influence of the difference between the directions.

Then, in step S107, the advanced-action-model generation unit 104 stores the similarity degree calculated in step S106 in a predetermined storage area.

Next, in step S108, the advanced-action-model generation unit 104 determines whether or not generation of the candidate models has been completed.

If there is an ungenerated candidate model, the process returns to step S105. On the other hand, if the generation of the candidate models has been completed, the process proceeds to step S109.

In step S109, the advanced-action-model generation unit 104 designates a candidate model with the highest similarity degree as the advanced-action model.

Consequently, the advanced-action model which is a combination of the two or more basic-action models has been acquired.

Finally, in step S110, the advanced-action-model generation unit 104 stores the advanced-action model designated in step S109 in the advanced-action-model storage unit 105.

Figure 8:
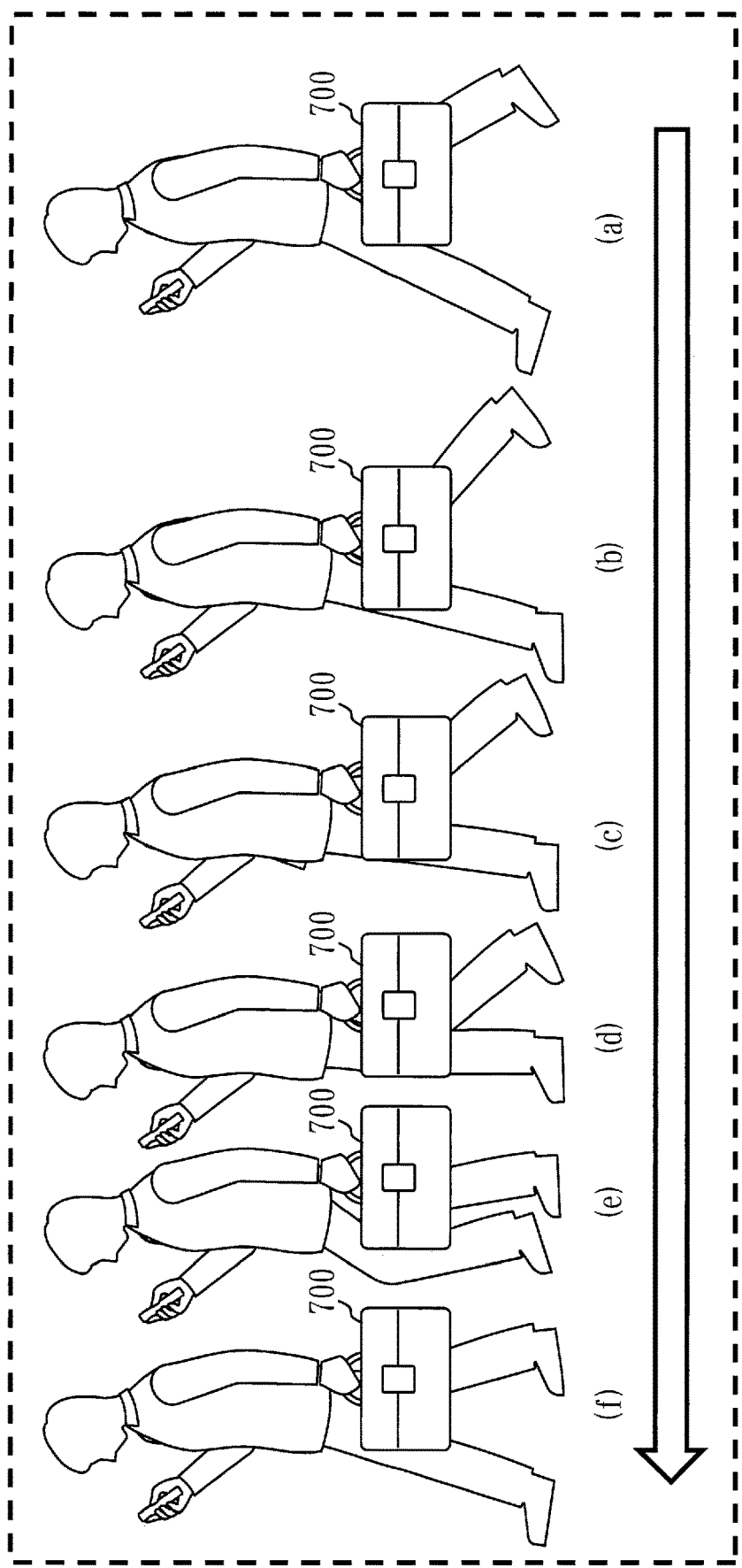
FIG. 8 is a diagram illustrating an example of a provisional model according to the first embodiment.

FIG. 8 illustrates an example of the provisional model generated in step S104.

The advanced-action-model generation unit 104 learns video data (moving-image data) in which a person walks in a direction of an arrow in order from (a) to (f) as with FIG. 4, and generates the provisional model for "a smart phone while walking".

Since the number of pieces of the video data of "a smart phone while walking" is small, for example, only video data in which leg parts are hidden by a bag 700 as illustrated in FIG. 8 is obtained. Since correct learning results of the leg parts hidden by the bag 700 cannot be obtained from the video data in FIG. 8, the coordinate values (x, y, and z) of the leg parts are incorrect in the provisional model.

Figure 9:
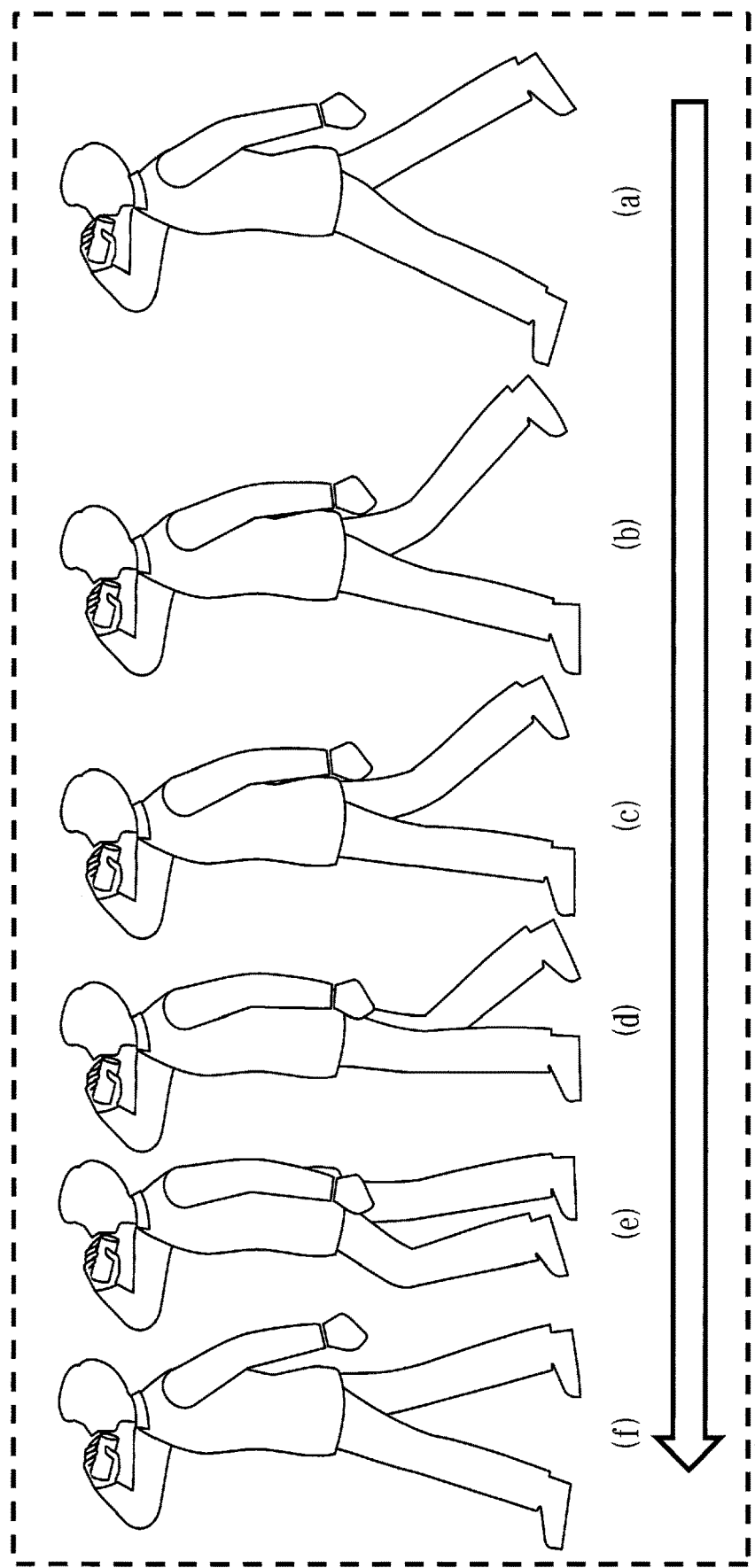
FIG. 9 is a diagram illustrating an example of a candidate model according to the first embodiment.
Figure 10:
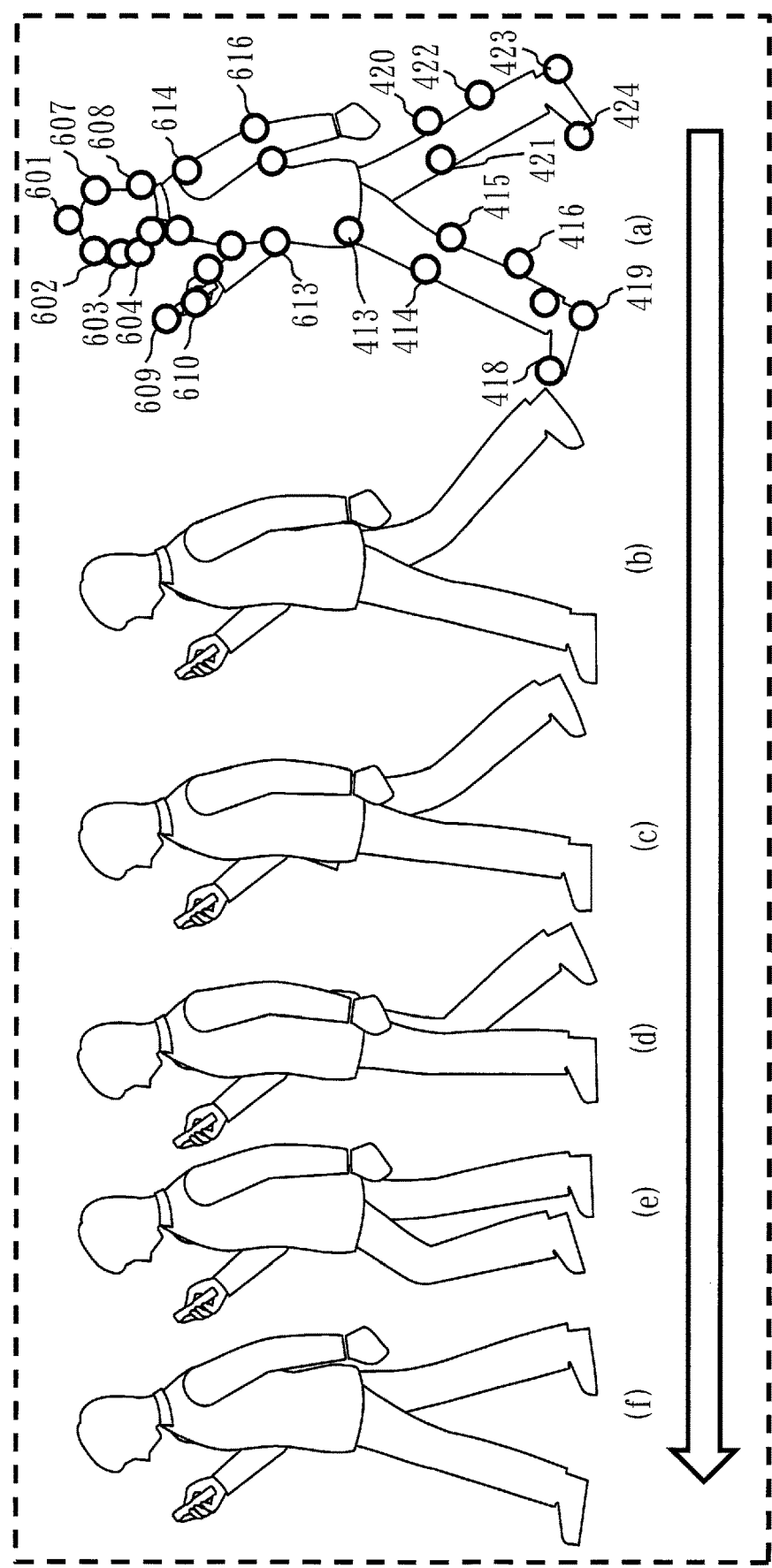
FIG. 10 is a diagram illustrating an example of an advanced-action model according to the first embodiment.

FIGS. 9 and 10 illustrates examples of the candidate models generated in step S105.

FIG. 9 illustrates an example of a candidate model obtained by combining the basic-action model for "walk" and a basic-action model for "drink a canned beverage".

FIG. 10 is an example of a candidate model obtained by combining the basic-action model for "walk" and the basic-action model for "look at a smart phone".

In a case of "a smart phone while walking", it is easy to imagine that combining the basic-action model for "walk" and the basic-action model for "look at a smart phone" is proper. However, it may be unclear as to which basic actions should be combined in some cases, depending on a type of the advanced action. Therefore, the advanced-action-model generation unit 104 generates a plurality of candidate models, combining the two or more basic-action models in a brute-force manner.

The advanced-action-model generation unit 104 calculates similarity degrees between the provisional model (FIG. 8) for "a smart phone while walking" and each of the candidate models (FIGS. 9 and 10).

Then, although the leg parts are hidden by the bag 700 in the provisional model of FIG. 8, the advanced-action-model generation unit 104 determines that the candidate model of FIG. 10 has a higher similarity degree, and designates the candidate model of FIG. 10 as the advanced-action model.

The advanced-action model of FIG. 10 is constituted by the states of person's parts 601 to 616 in FIG. 6 and the states of person's parts 413 to 424 in FIG. 4, as illustrated in FIG. 11, for example.

In FIG. 10, for drawing convenience, numerals are not assigned to all of person's parts, but the person's parts 601 to 616 illustrated in FIG. 6 and the person's parts 413 to 424 illustrated in FIG. 4 are included.

\*\*\*Description of Effect of Embodiment\*\*\*

According to the present embodiment, it is possible to generate the proper model also for the complex action for which the number of samples of the video data is small.

Also, in the present embodiment, the provisional model and the candidate models are generated, and a candidate model whose similarity degree to the provisional model is the highest is designated as the advanced-action model. Therefore, according to the present embodiment, even when it is unclear as to which basic-action models should be used for the advanced-action model, it is possible to generate the advanced-action model, by combining the proper basic-action models.

Further, in the present embodiment, the advanced-action model is generated by combining the basic-action models indicating the states of each part of the movable object. Therefore, according to the present embodiment, even when the parts of the movable object are partially hidden, it is possible to properly recognize the advanced action.

Figure 12:
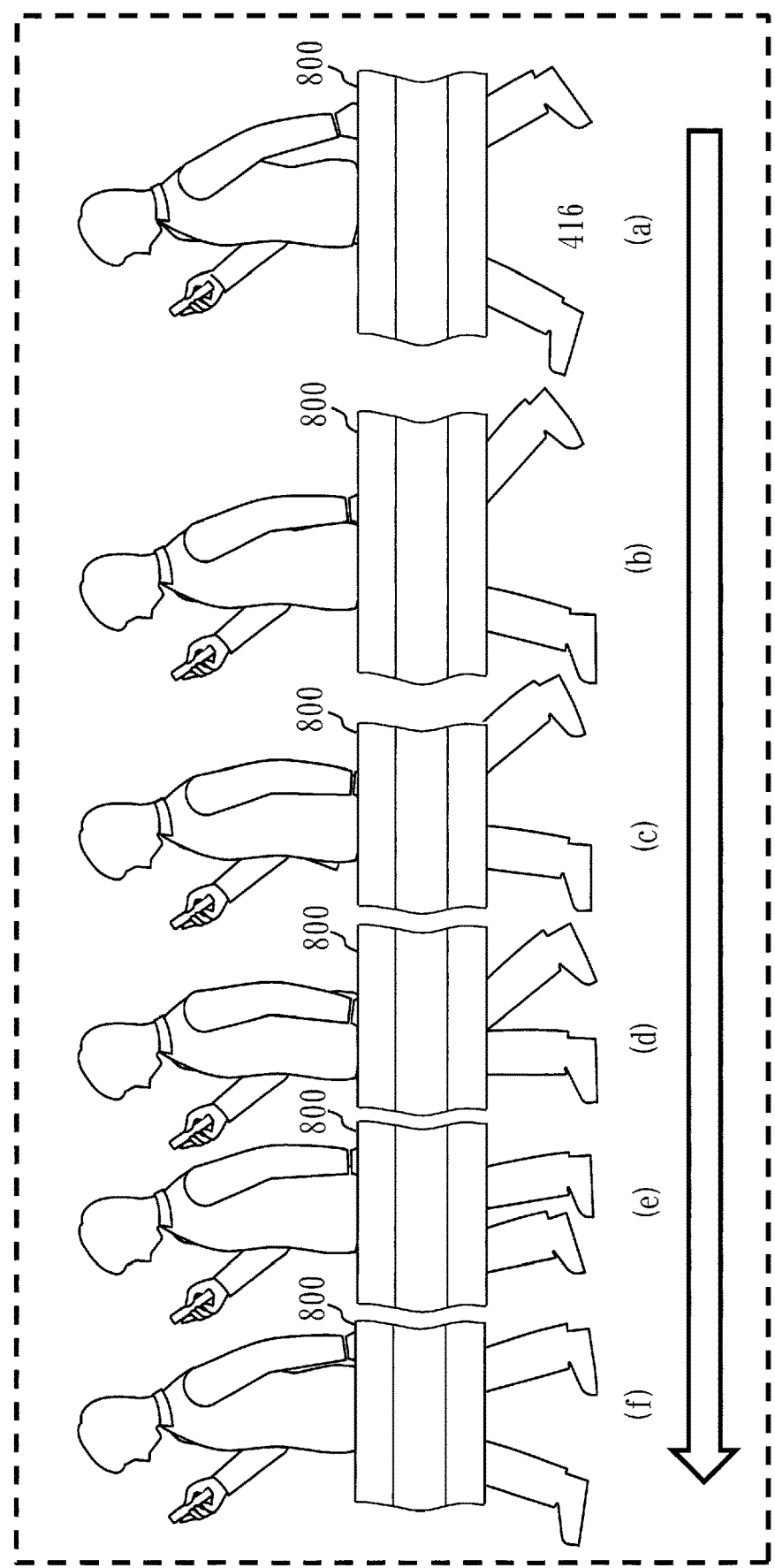
FIG. 12 is a diagram illustrating an example of video data in which a body is partially hidden, according to the first embodiment.

For example, even when the body of the person is partially hidden by the bag 700 as illustrated in FIG. 8 or even when the body of the person is partially hidden by a guardrail 800 as illustrated in FIG. 12, it is possible to correctly detect the "a smart phone while walking" action, using the advanced-action model of "a smart phone while walking".

In the present embodiment, an example has been described in which the basic-action-model generation unit 101 generates the basic-action models in the action-model generation apparatus 100. Instead of this, an outside apparatus outside of the action-model generation apparatus 100 may generate the basic-action models. A generation method of the basic-action models by the outside apparatus in this case is the same as the generation method of the basic-action models by the basic-action-model generation unit 101 which has been described above.

In the action-model generation apparatus 100, the basic-action-model acquisition unit 103 acquires the basic-action models from the outside apparatus. In a case where the outside apparatus generates the basic-action models, the basic-action-model generation unit 101 and the basic-action-model storage unit 102 can be omitted from the configuration of FIG. 2.

Second Embodiment

In the present embodiment, mainly matters different from the first embodiment will be described.

Note that, matters not described below are the same as those in the first embodiment.

Figure 13:
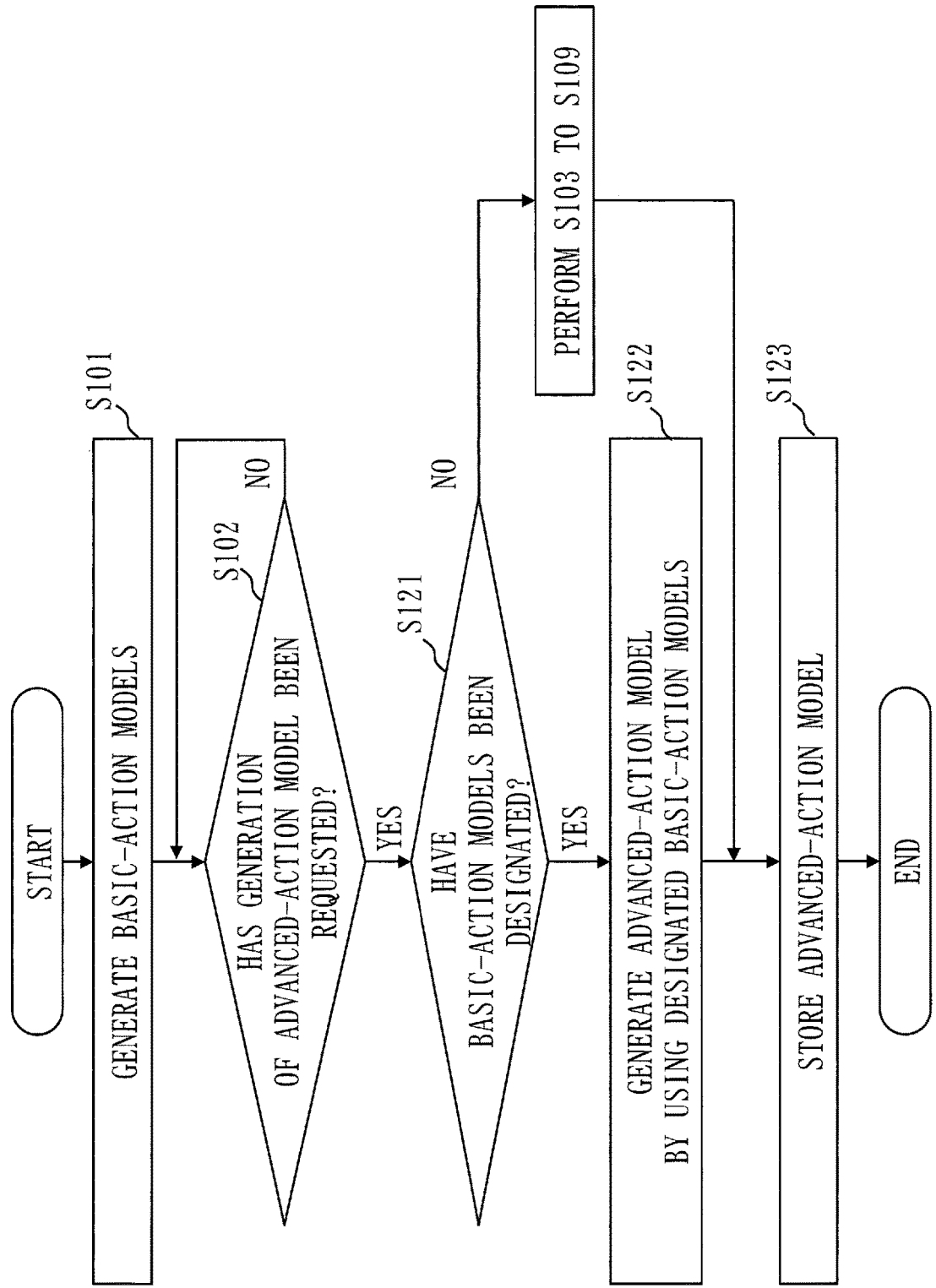
FIG. 13 is a flowchart illustrating an operation example of an action-model generation apparatus according to a second embodiment.

In the flowchart of FIG. 3 indicated in the first embodiment, the advanced-action-model generation unit 104 generates the provisional model and the candidate models and designates as the advanced-action model, the candidate model whose similarity degree to the provisional model is the highest. Instead of this, as illustrated in FIG. 13, the advanced-action-model generation unit 104 may generate the advanced-action model according to an instruction from the user of the action-model generation apparatus 100.

Below, a flow of FIG. 13 will be described.

Since steps S101 and S102 are the same as those in FIG. 3, descriptions will be omitted.

Next, in step S121, the advanced-action-model generation unit 104 determines whether or not the basic-action models to be used for the advanced-action model have been designated by the user of the action-model generation apparatus 100.

In a case of requesting the generation of the advanced-action model for "a smart phone while walking", the user of the action-model generation apparatus 100 designates the basic-action model for the "walk" action and the basic-action model for the "look at a smart phone" action, for example.

When the basic-action models have been designated by the user of the action-model generation apparatus 100, the process proceeds to step S122. On the other hand, when the basic-action models have not been designated, steps S103 to S109 in FIG. 3 are performed.

In step S122, the advanced-action-model generation unit 104 generates the advanced-action model by combining the basic-action models designated by the user.

In the above-described example, the advanced-action-model generation unit 104 generates the advanced-action model for "a smart phone while walking", by combining the basic-action model for the "walk" action and the basic-action model for the "look at a smart phone" action which have been designated by the user.

Finally, in step S123, the advanced-action-model generation unit 104 stores the advanced-action model generated in step S122 in the advanced-action-model storage unit 105.

Consequently, also in the present embodiment, it is possible to generate the proper model also for the complex action for which the number of samples of the video data is small.

Third Embodiment

In the present embodiment, mainly matters different from the first embodiment will be described.

Note that, matters not described below are the same as those in the first embodiment.

In the first embodiment and the second embodiment, examples have been described in which the advanced-action model is generated combining the two or more basic actions.

In the present embodiment, an example will be described in which the action-model generation apparatus 100 generates a new advanced-action model by replacing a portion of an advanced-action model having been generated with at least a portion of the basic-action model or at least a portion of another advanced-action model.

Also in the present embodiment, a hardware configuration example of the action-model generation apparatus 100 is as illustrated in FIG. 1. Also, a functional configuration example of the action-model generation apparatus 100 is as illustrated in FIG. 2.

Figure 14:
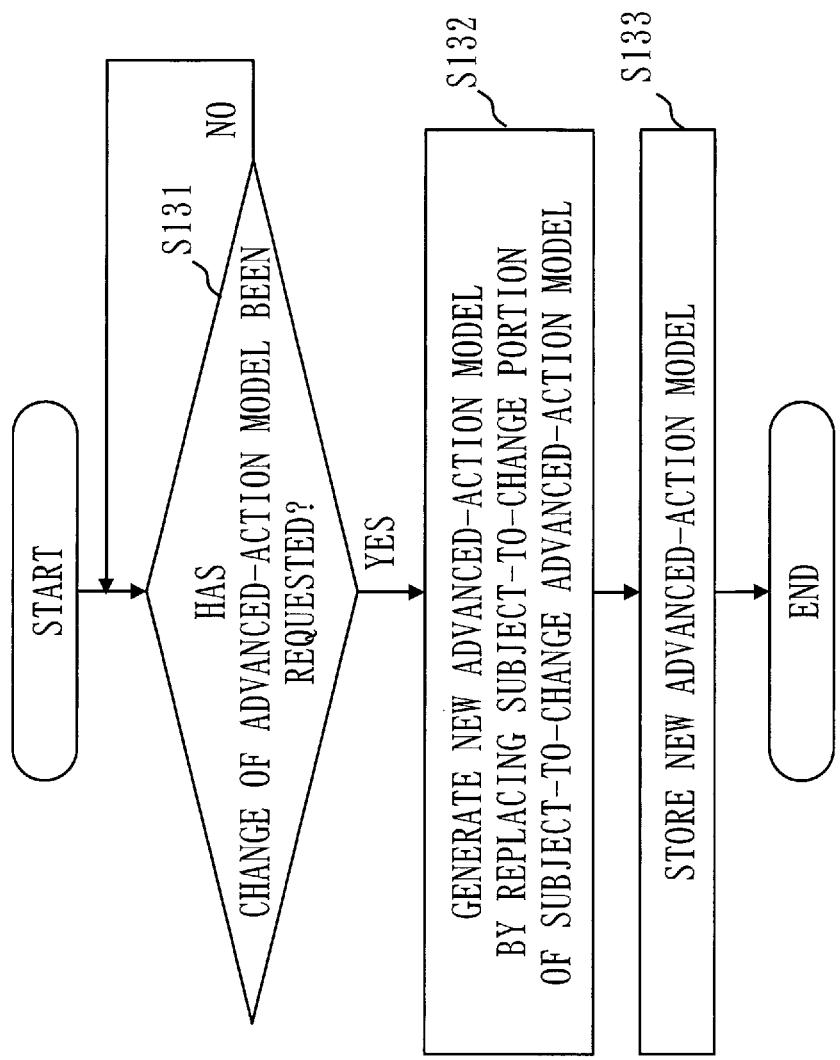
FIG. 14 is a flowchart illustrating an operation example of an action-model generation apparatus according to a third embodiment.

FIG. 14 illustrates an operation example of the action-model generation apparatus 100 according to the present embodiment.

First, in step S131, the advanced-action-model generation unit 104 determines whether or not a change of the advanced-action model has been requested.

Here, the user of the action-model generation apparatus 100 designates an advanced-action model (hereinafter, referred to as a "subject-to-change advanced-action model") whose portion is to be changed, and a basic-action model or another advanced-action model (hereinafter, each referred to as a "changing-purpose model") either of which is used for changing the subject-to-change advanced-action model. Further, the user of the action-model generation apparatus 100 designates a portion (hereinafter, referred to as a "subject-to-change portion") subject to the change, in the subject-to-change advanced-action model, and a portion (hereinafter, a "changing-purpose portion") to be used for changing the subject-to-change portion, in the changing-purpose model.

When the change of the advanced-action model has been requested by the user, the process proceeds to step S132.

In step S132, the advanced-action-model generation unit 104 generates the new advanced-action model by replacing the subject-to-change portion of the subject-to-change advanced-action model with the changing-purpose portion of the changing-purpose model.

Finally, in step S133, the advanced-action-model generation unit 104 stores the new advanced-action model generated in step S132 in the advanced-action-model storage unit 105.

Here, the operation example of the action-model generation apparatus 100 according to a third embodiment will be described, using a specific example.

Figure 15:
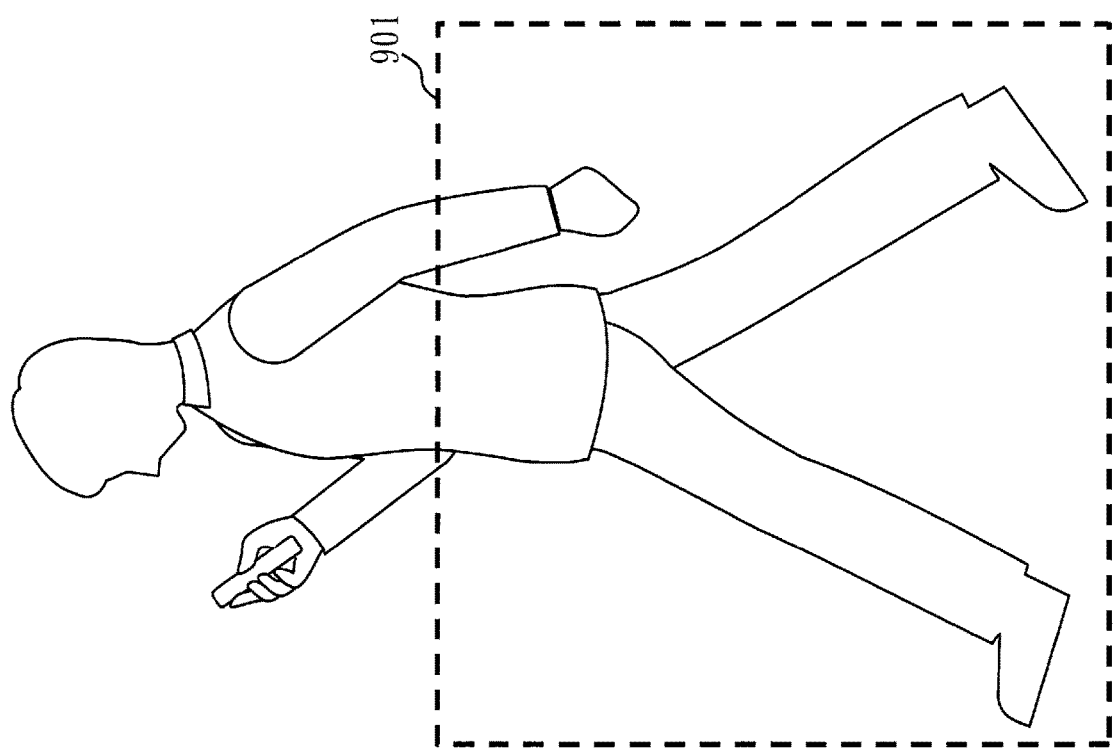
FIG. 15 is a diagram illustrating examples of a subject-to-change advanced-action model and a subject-to-change portion according to the third embodiment.

FIG. 15 illustrates examples of the subject-to-change advanced-action model and the subject-to-change portion which have been designated by the user of the action-model generation apparatus 100. In the examples of FIG. 15, the advanced-action model for "a smart phone while walking" has been designated as the subject-to-change advanced-action model. Also, a portion assigned a numeral 901 has been designated as the subject-to-change portion.

Figure 16:
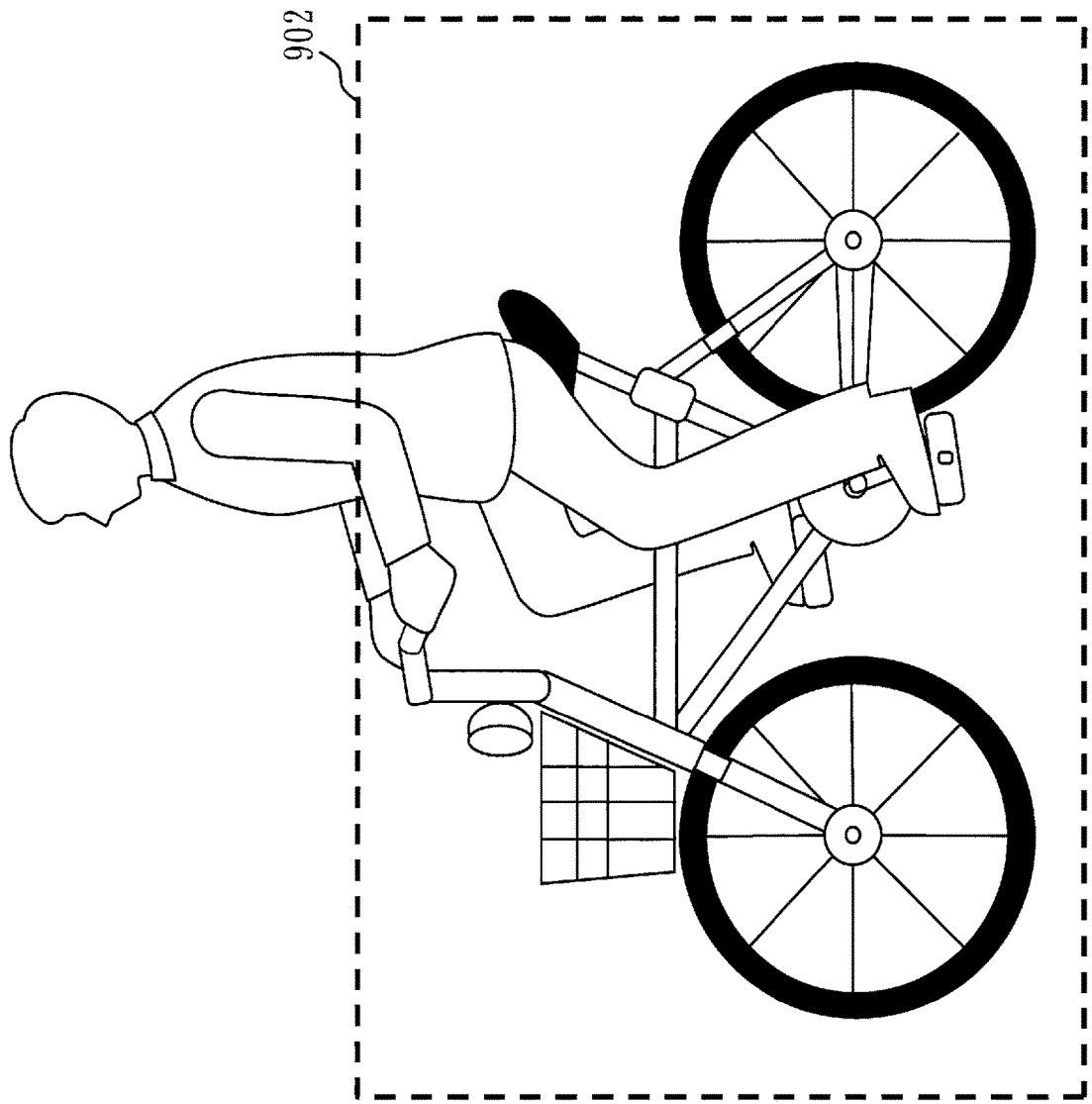
FIG. 16 is a diagram illustrating examples of a changing-purpose model and a changing-purpose portion according to the third embodiment.

FIG. 16 illustrates examples of the changing-purpose model and the changing-purpose portion which have been designated by the user of the action-model generation apparatus 100. In the examples of FIG. 16, a basic-action model for "ride a bicycle" has been designated as the changing-purpose model. Also, a portion assigned a numeral 902 has been designated as the changing-purpose portion.

Figure 17:
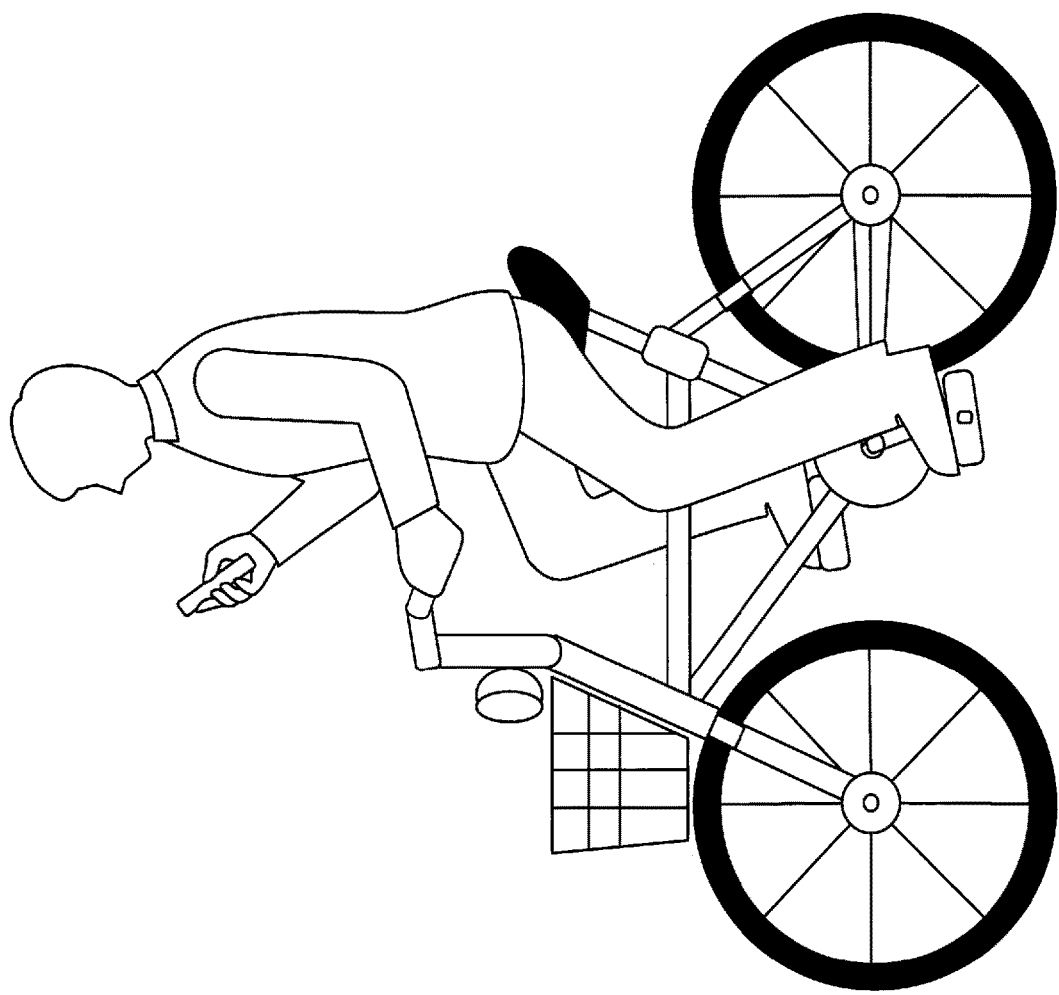
FIG. 17 is a diagram illustrating an example of a new advanced-action model according to the third embodiment.

The advanced-action-model generation unit 104 newly generates an advanced-action model for a "a smart phone while riding a bicycle" action illustrated in FIG. 17 by replacing the subject-to-change portion 901 in FIG. 15 with the changing-purpose portion 902 in FIG. 16.

In this way, according to the present embodiment, it is possible to generate the new advanced-action model by changing the portion of the advanced-action model having been generated.

Conventionally, for example, in a case where the model for the "a smart phone while riding a bicycle" action illustrated in FIG. 17 is generated, learning has been necessary with use of pieces of video data of the "a smart phone while riding a bicycle" action. Contrary to this, in the present embodiment, it is possible to generate the new advanced-action model corresponding to the "a smart phone while riding a bicycle" action without performing additional learning.

Consequently, it is possible to detect an action of looking at a smart phone while riding a bicycle, using the new advanced-action model corresponding to the "a smart phone while riding a bicycle" action.

Although the first to third embodiments have been described above, two or more of these embodiments may be combined and implemented.

Alternatively, one of these embodiments may be partially implemented.

Alternatively, two or more of these embodiments may be partially combined and implemented.

Further, the configurations and the procedures described in these embodiments may be modified as necessary.

*Supplementary Description of Hardware Configuration*

Finally, supplementary descriptions of the hardware configuration of the action-model generation apparatus 100 will be given.

The processor 151 illustrated in FIG. 1 is an IC (Integrated Circuit) that performs processing.

The processor 151 is a CPU (Central Processing Unit), a DSP (Digital Signal Processor), or the like.

The main storage device 152 illustrated in FIG. 1 is a RAM (Random Access Memory).

The auxiliary storage device 153 illustrated in FIG. 1 is a ROM (Read Only Memory), a flash memory, an HDD (Hard Disk Drive), or the like.

Further, the auxiliary storage device 153 also stores an OS (Operating System).

Then, at least a part of the OS is executed by the processor 151.

While executing at least the part of the OS, the processor 151 executes the programs which realize the functions of the basic-action-model generation unit 101, the basic-action-model acquisition unit 103, and the advanced-action-model generation unit 104.

By the processor 151 executing the OS, task management, memory management, file management, communication control, and the like are performed.

Further, at least one of information, data, a signal value, and a variable value that indicate results of processes of the basic-action-model generation unit 101, the basic-action-model acquisition unit 103, and the advanced-action-model generation unit 104 is stored in at least one of the main storage device 152, the auxiliary storage device 153, and a register and a cash memory in the processor 151.

Further, the programs which realize the functions of the basic-action-model generation unit 101, the basic-action-model acquisition unit 103, and the advanced-action-model generation unit 104 may be stored in a portable recording medium such as a magnetic disk, a flexible disk, an optical disc, a compact disc, a Blu-ray (registered trademark) disc, or a DVD. Then, the portable recording medium storing the programs which realize the functions of the basic-action-model generation unit 101, the basic-action-model acquisition unit 103, and the advanced-action-model generation unit 104 may be distributed.

Further, "unit" of the basic-action-model generation unit 101, the basic-action-model acquisition unit 103, and the advanced-action-model generation unit 104 may be replaced by "circuit". "step", "procedure", or "process".

Further, the action-model generation apparatus 100 may be realized by a processing circuit. The processing circuit is, for example, a logic IC (Integrated Circuit), a GA (Gate Array), an ASIC (Application Specific Integrated Circuit), or an FPGA (Field-Programmable Gate Array).

Note that, in the present specification, a superordinate concept of the processor and the processing circuit is referred to as "processing circuitry".

That is, each of the processor and the processing circuit is a specific example of the "processing circuitry".

REFERENCE SIGNS LIST

100: action-model generation apparatus, 101: basic-action-model generation unit, 102: basic-action-model storage unit, 103: basic-action-model acquisition unit, 104: advanced-action-model generation unit, 105: advanced-action-model storage unit, 151: processor, 152: main storage device, 153: auxiliary storage device, 154: input/output device.

The invention claimed is:

1. An action-model generation apparatus comprising: processing circuitry
    to perform learning with use of video data indicating a basic action of a movable body, as teacher data, analyze transition of a state of each of a plurality of parts of the movable body, and generate a basic-action model which is a model for recognizing the basic action and indicates the transition of the state of each part of the movable body;
    to acquire the basic-action model generated, for each of a plurality of the basic actions; and
    to perform learning with use of video data, as teacher data, indicating an advanced action which is an action more complex than the basic action, analyze the transition of the state of each of the plurality of parts of the movable object, generate as a provisional model, a model for recognizing the advanced action, which indicates the transition of the state of each part of the movable object, combine two or more basic-action models a result of combination of which resembles the provisional model, among a plurality of basic-action models, and generate an advanced-action model which is a model for recognizing the advanced action, wherein
    the processing circuitry further
    combines two or more basic-action models among the plurality of basic-action models, and generates a plurality of candidate models which are candidates for the advanced-action model, and
    calculates similarity degrees between each of the plurality of candidate models and the provisional model, and designates as the advanced-action model, a candidate model whose similarity degree is the highest.

2. The action-model generation apparatus according to claim 1, wherein
    the processing circuitry combines two or more basic-action models designated from among the plurality of basic-action models, and generates the advanced-action model.

3. An action-model generation method comprising:
    performing learning with use of video data indicating a basic action of a movable body, as teacher data, analyzing transition of a state of each of a plurality of parts of the movable body, and generating a basic-action model which is a model for recognizing the basic action and indicates the transition of the state of each part of the movable body;
    acquiring the basic-action model generated, for each of a plurality of the basic actions; and
    performing learning with use of video data, as teacher data, indicating an advanced action which is an action more complex than the basic action, analyzing the transition of the state of each of the plurality of parts of the movable object, generating as a provisional model, a model for recognizing the advanced action, which indicates the transition of the state of each part of the movable object, combining two or more basic-action models a result of combination of which resembles the provisional model, among a plurality of basic-action models, and generating an advanced-action model which is a model for recognizing the advanced action, wherein
    the method further comprises
    combining two or more basic-action models among the plurality of basic-action models, and generating a plurality of candidate models which are candidates for the advanced-action model, and
    calculating similarity degrees between each of the plurality of candidate models and the provisional model, and designating as the advanced-action model, a candidate model whose similarity degree is the highest.

* * * * *